United States Patent
Lu et al.

(10) Patent No.: US 10,495,176 B2
(45) Date of Patent: Dec. 3, 2019

(54) ADJUSTABLE DAMPER AND METHOD FOR CONTROLLING THE SAME

(71) Applicant: INDUSTRIAL TECHNOLOGY RESEARCH INSTITUTE, Hsinchu (TW)

(72) Inventors: Hung-I Lu, New Taipei (TW); Chien-Chih Liao, Taichung (TW); Jen-Ji Wang, Taichung (TW); Yun-Chiao Chen, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 158 days.

(21) Appl. No.: 15/851,508

(22) Filed: Dec. 21, 2017

(65) Prior Publication Data

US 2019/0145480 A1  May 16, 2019

(30) Foreign Application Priority Data

Nov. 10, 2017 (TW) .............................. 106139019 A (51) Int. Cl.
*E04B 1/98* (2006.01)
*F16F 7/10* (2006.01)
(Continued)

(52) U.S. Cl.
CPC ............ *F16F 7/1005* (2013.01); *F16F 7/104* (2013.01); *F16F 2228/04* (2013.01);
(Continued)

(58) Field of Classification Search
CPC ............ E04B 1/98; E04H 9/021; E04H 9/023
(Continued)

(56) References Cited

U.S. PATENT DOCUMENTS 4,596,373 A * 6/1986 Omi ..................... F16F 15/02
                                            248/421
4,662,133 A * 5/1987 Kondo ................. E04H 9/021
                                            248/567

(Continued)

FOREIGN PATENT DOCUMENTS

CN       1091229 C     9/2002
CN     101542411 A     9/2009
(Continued)

OTHER PUBLICATIONS

Taiwanese Office Action for corresponding application No. 106139019, dated Jun. 21, 2018.
(Continued)

*Primary Examiner* — Christopher P Schwartz
(74) *Attorney, Agent, or Firm* — Maschoff Brennan (57) ABSTRACT

An adjustable damper includes a base, a first and second slidable members, a movable seat, a mass unit, and a first and second cantilevers. The first slidable member is slidably disposed on the base in a first direction. The movable seat is slidably disposed on the base in a second direction orthogonal to the first direction. The second slidable member is slidably disposed on the movable seat in the second direction. The mass unit is slidably disposed on the movable seat in the first direction. The first cantilever is fixed to a first connecting member. The first connecting member is connected to the movable seat. The first slidable member movably is disposed on the first cantilever. The second cantilever is fixed to a second connecting member. The second connecting member is connected to the mass unit. The second slidable member is movably disposed on the second cantilever.

9 Claims, 9 Drawing Sheets (51) Int. Cl.
*F16F 7/104* (2006.01)
*H02K 7/14* (2006.01)

(52) U.S. Cl.
CPC ..... *F16F 2228/066* (2013.01); *F16F 2230/18* (2013.01); *H02K 7/14* (2013.01)

(58) Field of Classification Search
USPC .............. 188/382; 267/136; 52/167.1–167.7; 248/636, 638, 562
See application file for complete search history.

(56) References Cited

U.S. PATENT DOCUMENTS

| | | | | |
|---|---|---|---|---|
| 4,917,211 | A | * | 4/1990 | Yamada ............... E04H 9/023 181/0.5 |
| 5,107,634 | A | * | 4/1992 | Onoda ................ B64G 1/22 52/1 |
| 5,592,791 | A | * | 1/1997 | D'Annunzio .......... E04B 1/985 52/1 |
| 5,816,559 | A | * | 10/1998 | Fujimoto .............. E04H 9/021 248/636 |
| 5,915,508 | A | * | 6/1999 | Lai ...................... F16F 1/387 188/379 |
| 5,970,666 | A | * | 10/1999 | Kurabayashi ......... E04H 9/023 52/167.6 |
| 6,385,917 | B1 | * | 5/2002 | Konomoto ............ E04H 9/021 52/167.1 |
| 7,410,039 | B2 | | 8/2008 | Or et al. |
| 9,739,336 | B2 | | 8/2017 | Bronowicki |

FOREIGN PATENT DOCUMENTS

| | | | |
|---|---|---|---|
| CN | 102995786 | B | 3/2013 |
| CN | 103867636 | A | 6/2014 |
| CN | 105133744 | A | 12/2015 |
| CN | 105887661 | A | 8/2016 |
| CN | 107061614 | A | 8/2017 |
| EP | 2708316 | B1 | 3/2014 |
| JP | 2013-180870 | A | 9/2013 |
| TW | 200613659 | A | 5/2006 |
| TW | M291480 | B1 | 6/2006 |
| TW | 200923165 | A | 6/2009 |

OTHER PUBLICATIONS

"A New Tunable Dynamics Platform for Milling Experiments", Tyler Ransom, Andrew Honeycutt, Tony, Schmitz Precision Engineering, Jan. 13, 2016, 252-256.

"Design and Analysis of a New Type of Electromagnetic Damper with Increased Energy Density", Lei Zuo, Xiaoming Chen, Samir Nayfeh, Journal of Vibration and Acoustics, Apr. 7, 2011, 041006-1-8.

"Design and Analysis of a Variable Stiffness Mechanism", Olugbenga M. Anubi, Carl D. Crane III, , Shanon Ridgeway, Proceedings of the ASME 2011 International Design Engineering Technical Conferences & Computers and Information in Engineering Conference, Aug. 15-18, 2010, 589-596.

"Self-Tuning Dynamic Vibration Absorber for Machine Tool Chatter Suppression", Gorka Aguirre, Mikel Gorostiaga, Thomas Porchez, and Jokin Munoa, 28th Annual Meeting of the AmericanSociety for Precission Engineering (ASPE), Oct. 16, 2014, HAL Id: hal-01074955.

"Variable Stiffness Legs for Robust, Efficient, and Stable Dynamic Running", Kevin C. Galloway, Jonathan E. Clark and Daniel, E. Koditschek, Journal of Mechanisms and Robotics, Jan. 24, 2013, 011009-1-11.

"Vibration Suppression of a Cantilever Beam Using Magnetically Tuned-Mass-Damper", Jae-Sung Bae, Jai-Hyuk Hwang, Jin-Ho Roh, Jong-Hyuk Kim, Mi-Seon Yi, and Jae Hyuk Lim, Journal of Sound and Vibration, Jul. 12, 2012, 5669-5684.

* cited by examiner

ADJUSTABLE DAMPER AND METHOD FOR CONTROLLING THE SAME

CROSS-REFERENCE TO RELATED APPLICATIONS

This non-provisional application claims priority under 35 U.S.C. § 119(a) on Patent Application No(s). 106139019 filed in Taiwan, R.O.C. on Nov. 10, 2017, the entire contents of which are hereby incorporated by reference.

TECHNICAL FIELD

The disclosure relates to a damper and a method, more particularly to an adjustable damper and a method for controlling the same.

BACKGROUND

Conventionally, tuned mass damper (TMD), a device consisting of a mass, a spring and a damper, is simple in structure and requires no power input. When the natural frequency of TMD matches the frequency of a main structure, vibration of the main structure makes the TMD to vibrate in resonance, dissipating a substantial amount of vibration energy of the main structure. Therefore, TMD is widely employed in vibration control for bridge, high-rise building, machine tools and many other engineering systems.

It can be seen that the conventional TMD could exert damping effect only when its natural vibration frequency matches the vibration frequency of the main structure. That is, as the vibration frequency of the main structure varies, it would decrease the effect of TMD or cause TMD to fail.

SUMMARY

One embodiment of the disclosure provides an adjustable damper including a base, a first slidable member, a movable seat, a second slidable member, a mass unit, a first cantilever and a second cantilever. The first slidable member is slidably disposed on the base in a first direction. The movable seat is slidably disposed on the base in a second direction, wherein the second direction is orthogonal to the first direction. The second slidable member is slidably disposed on the movable seat in the second direction. The mass unit is slidably disposed on the movable seat in the first direction. The first cantilever is fixed to a first connecting member and extending in the first direction. The first connecting member is connected to the movable seat. The first slidable member movably is disposed on the first cantilever so as to be moved close to or away from the first connecting member along the first cantilever. The second cantilever is fixed to a second connecting member and extending in the second direction. The second connecting member is connected to the mass unit. The second slidable member is movably disposed on the second cantilever so as to be moved close to or away from the second connecting member along the second cantilever.

One embodiment of the disclosure provides a method adapted to control an adjustable damper. The adjustable damper is adapted to be placed on a main structure. The adjustable damper includes a mass unit, a first cantilever fixed to a first connecting member and extending in a first direction, a first slidable member movable close to or away from the first connecting member along the first cantilever, a second cantilever fixed to a second connecting member and extending in a second direction which is orthogonal to the first direction, and a second slidable member movable close to or away from the second connecting member along the second cantilever. The method includes capturing a vibration signal of the main structure by a vibration signal capturing unit of the adjustable damper, outputting a vibration frequency of the main structure according to the vibration signal by a processing unit, and adjusting a distance between the first connecting member and the first slidable member and/or a distance between the second connecting member and the second slidable member based on the vibration frequency by the processing unit so as to adjust the stiffness of the adjustable damper in the first direction and/or the second direction, thereby adjusting a natural vibration frequency of the adjustable damper to match the vibration frequency of the main structure.

According to the adjustable damper and the method as discussed above, since the first slidable member is movable close to or away from the first connecting member, and the second slidable member is movable close to or away from the second connecting member, the stiffness of the adjustable damper in the first direction and the second direction becomes adjustable, making the natural vibration frequency of the adjustable damper changeable and able to selectively or automatically match the vibration frequency of the main structure.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known main structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure. Furthermore, in order to simplify the drawings, some conventional structures and components are drawn in a simplified manner to keep the drawings clean.

Figure 1:
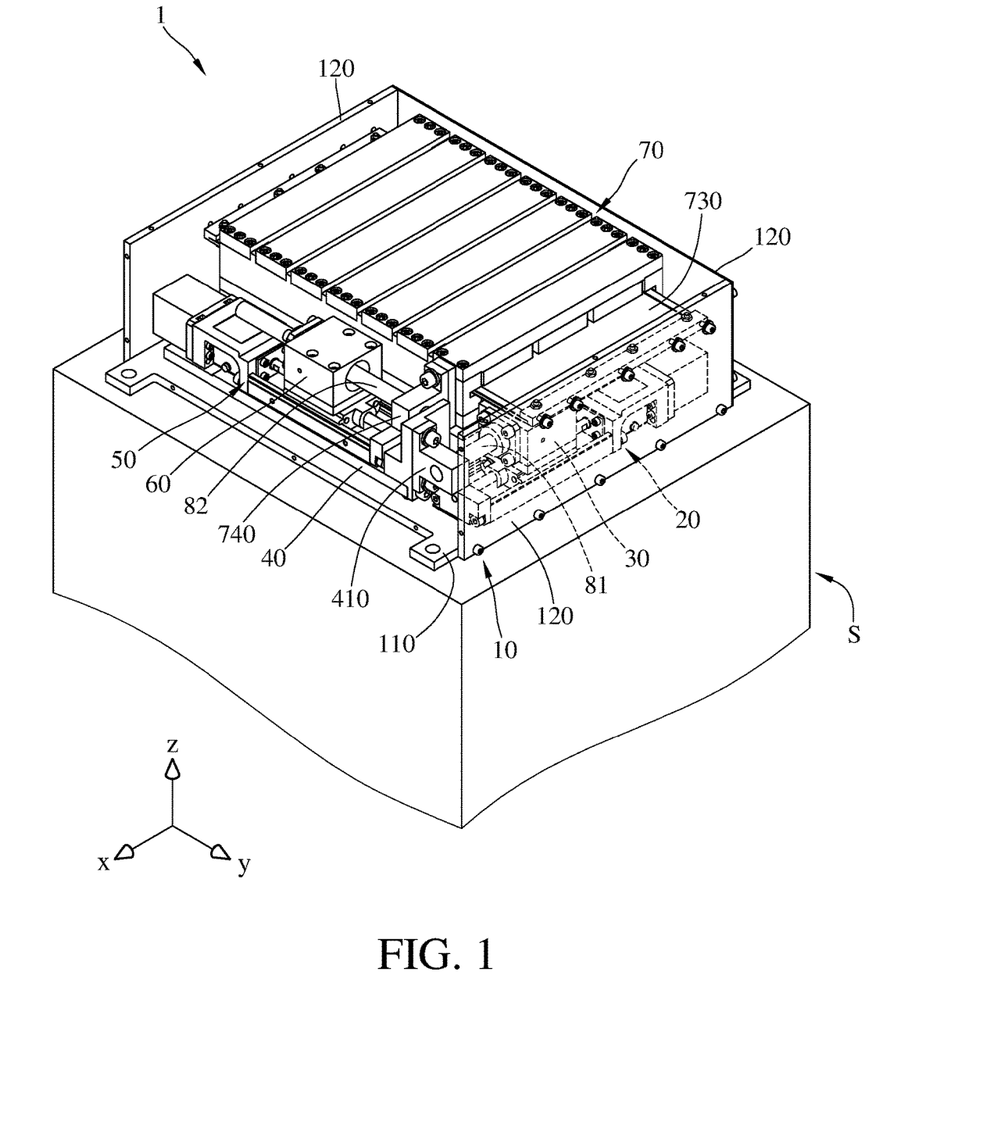
FIG. 1 is a perspective view of an adjustable damper according to one embodiment of the disclosure being disposed on a main structure.
Figure 2:
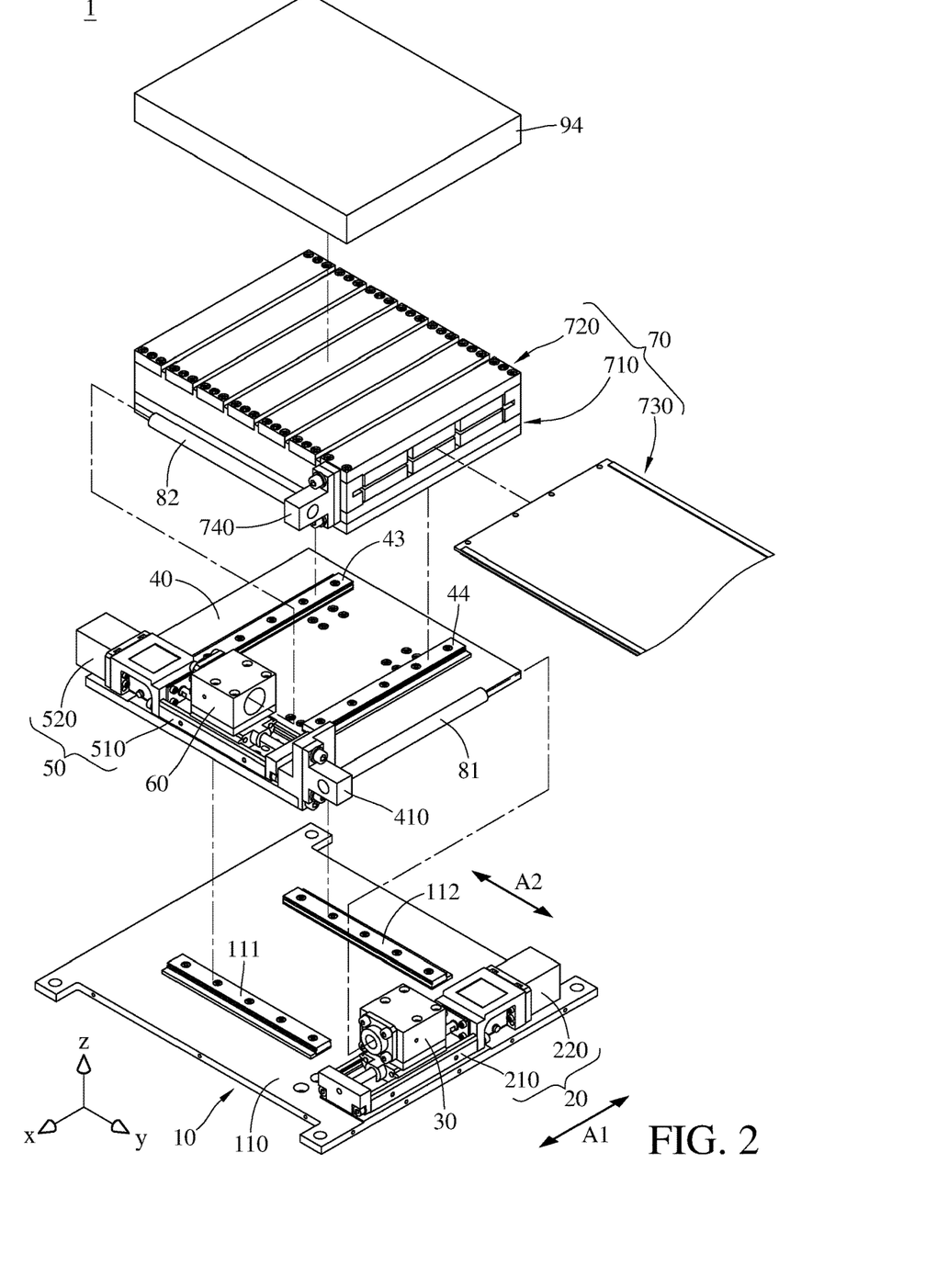
FIGS. 2-3 are exploded views of the adjustable damper in FIG. 1 taken from different view angles.
Figure 3:
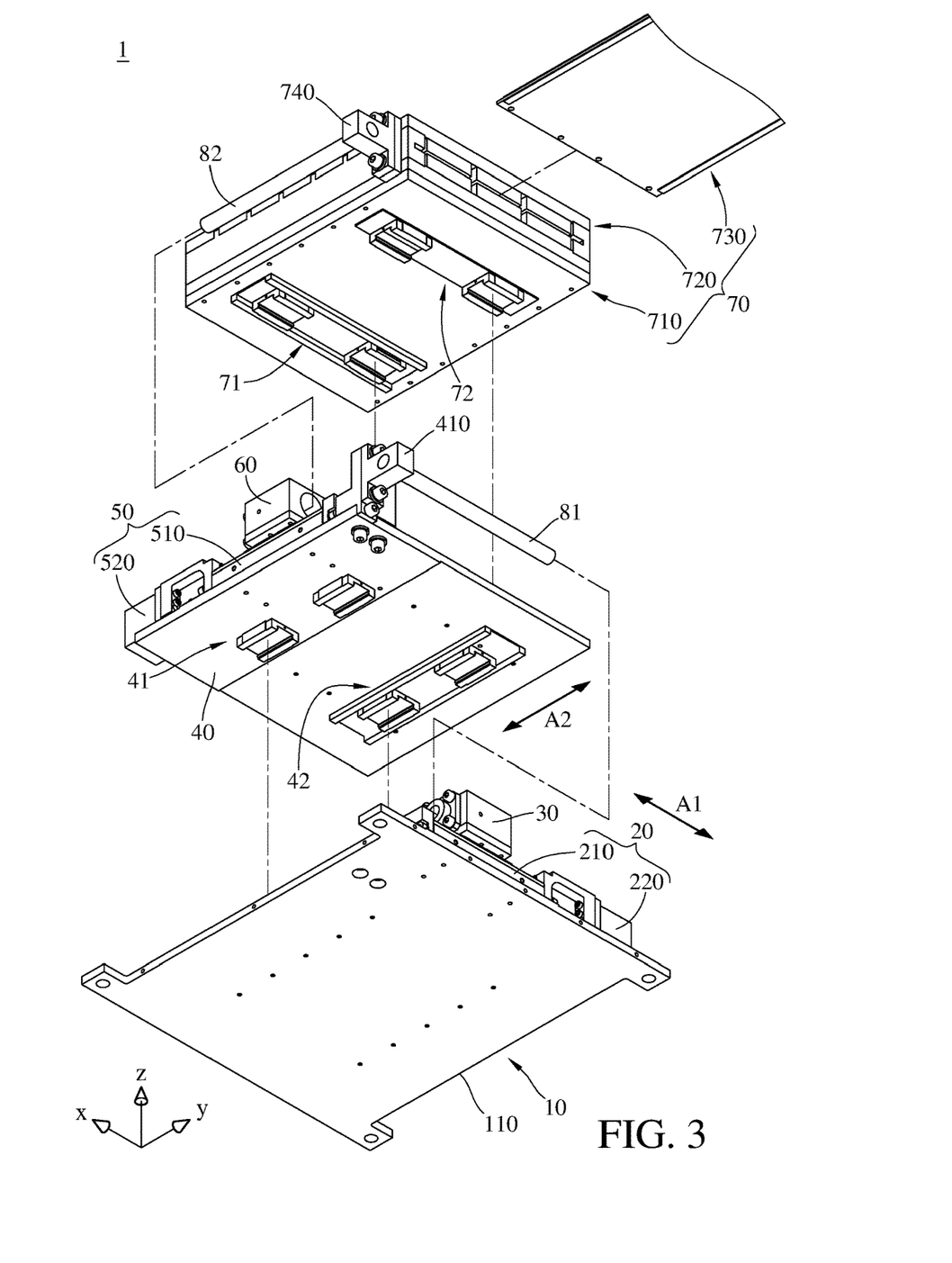

Please refer to FIGS. 1-3, FIG. 1 is a perspective view of an adjustable damper according to one embodiment of the disclosure being disposed on a main structure, and FIGS. 2-3 are exploded views of the adjustable damper in FIG. 1 taken from different view angles.

This embodiment provides an adjustable damper 1 which is adapted to be placed on a main structure S in order to reduce the dynamic response of the main structure S. The said main structure S is, for example, a machining apparatus, such as a turning machine or a lathe, or another apparatus that will vibrate at one or more natural frequencies once it is in operation. The adjustable damper 1 is able to suppress or absorb the vibration of the main structure S. Detail descriptions of the adjustable damper 1 are illustrated in the following paragraphs.

In this embodiment, the adjustable damper 1 includes a base 10, a first slide mechanism 20, a first slidable member 30, a movable seat 40, a second slide mechanism 50, a second slidable member 60, a mass unit 70, a first cantilever 81 and a second cantilever 82.

The base 10 includes a bottom plate 110, a plurality of side plates 120 and a top plate (not shown). The bottom plate 110 can be attached on the main structure S. The side plates 120 are respectively fixed at sides of the bottom plate 110. The top plate is disposed on the side of the side plates 120, which is opposite to the bottom plate 110, so that the base 10 becomes a sealed box. However, for the purpose of clear illustration, in FIG. 1, the base 10 only illustrates three side plates 120 and the bottom plate 110, and in FIGS. 2-3, the base 10 only illustrates the bottom plate 110. In addition, the present disclosure is not limited to the configuration of the base 10. In some other embodiments, the base may only include one bottom plate and one side plate; alternatively, the base may be a U-shaped single piece.

The first slide mechanism 20 includes a first rail 210 and a first motor 220. The first rail 210 and the first motor 220 are both disposed on the bottom plate 110 of the base 10. The first rail 210 extends along a first direction A1. In the coordinates of the images, the first direction A1 is parallel to the X-axis.

The first slidable member 30 is slidably disposed on the first rail 210. The first motor 220 is configured to drive the first slidable member 30 to slide along the first rail 210. That is, the first slidable member 30 can be moved in the first direction A1 by being driven by the first motor 220.

The movable seat 40 is located at a side of the first slide mechanism 20 and is slidably disposed on the bottom plate 110 of the base 10 in a second direction A2. In the coordinates of the images, the second direction A2 is parallel to the Y-axis. Thus, it is understood that the first direction A1 is orthogonal to the second direction A2. In more detail, there are sliding blocks 41 and 42 disposed on the surface of the movable seat 40 facing the bottom plate 110 and extending along the second direction A2 (as shown in FIG. 3), and slide rails 111 and 112 disposed on the top surface of the bottom plate 110 and extending along the second direction A2 as well (as shown in FIG. 2). The sliding blocks 41 and 42 are respectively slidably disposed on the slide rails 111 and 112, enabling the movable seat 40 to slide with respect to the bottom plate 110 of the base 10 in the second direction A2.

However, the present disclosure is not limited to the mechanism for sliding the movable seat 40 relative to the bottom plate 110, any suitable design, which can make the movable seat 40 slidable on the bottom plate 110 along a single axis, falls within the scope of the present disclosure.

The first cantilever 81 is fixed to a first connecting member 410 and extends in the first direction A1. The first connecting member 410 is connected to the movable seat 40. Specifically, the first connecting member 410 is located at a side of the movable seat 40 close to the first slide mechanism 20, one end of the first cantilever 81 is fixed to the first connecting member 410, and the first cantilever 81 extends along the first direction A1 and penetrates through the first slidable member 30. In this embodiment, the first slidable member 30 and the first cantilever 81 together form, for example, a ball spline which can be preloaded to eliminate gap in the rotational direction so as to produce an accuracy and smooth movement.

Figure 4:
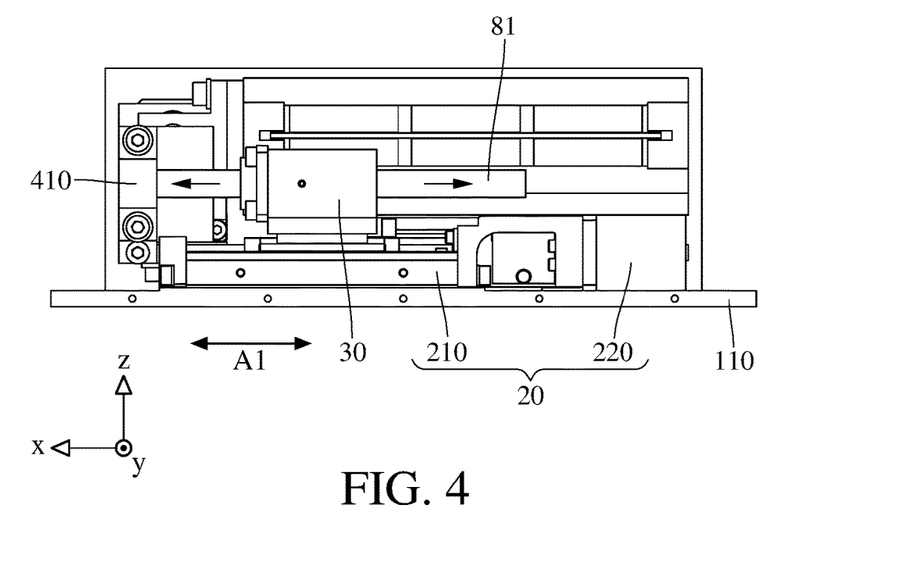
FIG. 4 is a side view of the adjustable damper in FIG. 1.

As shown in FIG. 4, FIG. 4 is a side view of the adjustable damper in FIG. 1. When the first slidable member 30 is driven by the first motor 220, the first slidable member 30 is able to be moved close to or away from the first connecting member 410 along the first cantilever 81. In other words, the first slidable member 30 is movably disposed on the first cantilever 81 so as to be moved close to or away from the first connecting member 410 along the first direction A1.

Then, please refer back to FIGS. 2-3, the second slide mechanism 50 includes a second rail 510 and a second motor 520. The second rail 510 and the second motor 520 are both disposed on the movable seat 40. The second rail 510 extends along the second direction A2.

The second slidable member 60 is slidably disposed on the second rail 510. The second motor 520 is configured to drive the second slidable member 60 to slide along the second rail 510. That is, the second slidable member 60 can be moved in the second direction A2 by being driven by the second motor 520.

The mass unit 70 is located at a side of the second slide mechanism 50 and is slidably disposed on the movable seat 40 in the first direction A1. In detail, there are sliding blocks 71 and 72 disposed on the surface of the mass unit 70 facing the movable seat 40 and extending along the first direction A1 (as shown in FIG. 3), and slide rails 43 and 44 disposed on the top surface of the movable seat 40 and extending along the first direction A1 as well (as shown in FIG. 2). The sliding blocks 71 and 72 are respectively slidably disposed on the slide rails 43 and 44, enabling the mass unit 70 to slide with respect to the movable seat 40 in the first direction A1. However, the present disclosure is not limited to the mechanism for sliding the mass unit 70 relative to the movable seat 40, any suitable design, which can make the mass unit 70 slidable on the movable seat 40 along a single axis, falls within the scope of the present disclosure.

The second cantilever 82 is fixed to a second connecting member 740 and extends in the second direction A2. The second connecting member 740 is connected to the mass unit 70. Specifically, the second connecting member 740 is located at a side of the mass unit 70 close to the second slide mechanism 50, one end of the second cantilever 82 is fixed to the second connecting member 740, and the second cantilever 82 extends along the second direction A2 and penetrates through the second slidable member 60. In this embodiment, the second slidable member 60 and the second cantilever 82 together form, for example, a ball spline, which can be preloaded to eliminate gap in the rotational direction so as to produce an accuracy and smooth movement.

Figure 5:
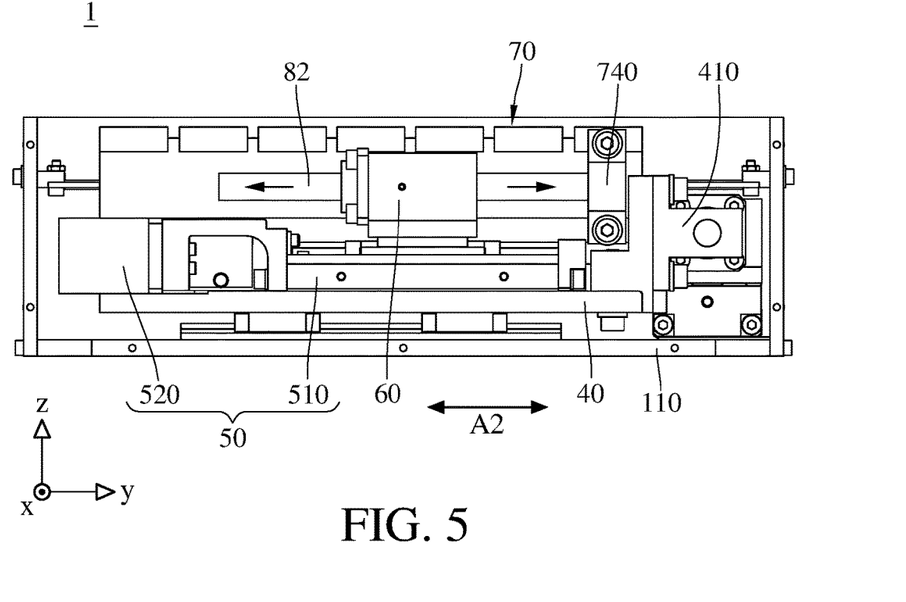
FIG. 5 is another side view of the adjustable damper in FIG. 1.

Then, as shown in FIG. 5, which is another side view of the adjustable damper in FIG. 1. When the second slidable member 60 is driven by the second motor 520, the second slidable member 60 is able to be moved close to or away from the second connecting member 740 along the second cantilever 82. In other words, the second slidable member 60 is movably disposed on the second cantilever 82 so as to be moved close to or away from the second connecting member 740 along the second direction A2.

Figure 6:
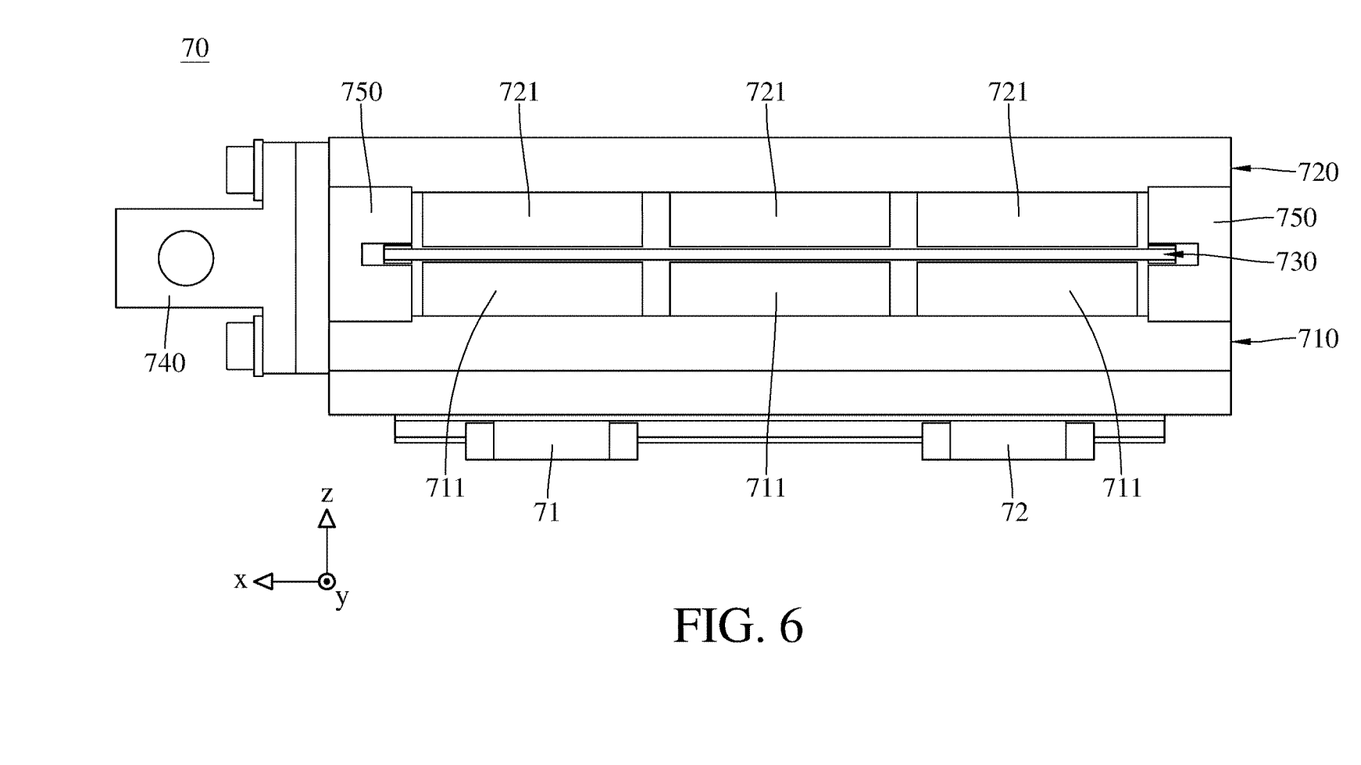
FIG. 6 is a side view of a mass unit in FIG. 1.

Then, please refer to FIGS. 2-3 and further refer to FIG. 6, FIG. 6 is a side view of a mass unit in FIG. 1. In this embodiment, the mass unit 70 includes a lower magnet set 710, an upper magnet set 720, a metal plate 730 and a pair of supporting members 750. The aforementioned sliding blocks 71 and 72 are attached to the bottom surface of the lower magnet set 710. The supporting members 750 are respectively disposed on two opposite sides of the top surface of the lower magnet set 710, and the upper magnet set 720 is disposed on the supporting members 750 so as to be stacked above the lower magnet set 710. The aforementioned second connecting member 740 is fixed to both the lower magnet set 710 and the upper magnet set 720, but the present disclosure is not limited thereto. In some other embodiments, the second connecting member 740 may be only fixed to the lower magnet set 710 or the upper magnet set 720. In more detail, the upper magnet set 720 includes a plurality of magnets 721, and the lower magnet set 710 includes a plurality of magnets 711. The magnetic pole of the magnets 721 is opposite to the magnetic pole of the magnets 711, such that the upper magnet set 720 and the lower magnet set 710 attract each other. The metal plate 730 penetrates through the area between the magnets 711 of the lower magnet set 710 and the magnets 721 of the upper magnet set 720, and the metal plate 730 are spaced apart with the magnets 711 and the magnets 721. The metal plate 730 is fixed to the base 10; specifically, as shown in FIG. 1, two opposite sides of the metal plate 730 are respectively fixed to two of the side plates 120 of the base 10. As shown in FIG. 6, the other two sides of the metal plate 730 are respectively located in the supporting members 750. In such a configuration, the upper magnet set 720 and the lower magnet set 710 are able to move in X-Y plane; that is, the lower magnet set 710 and the upper magnet set 720 are able to be moved along the two opposite surfaces of the metal plate 730, respectively. Thus, the metal plate 730 lies perpendicular to the magnetic line of force between the upper magnet set 720 and the lower magnet set 710, in addition to the material of the metal plate 730 is, for example, copper, such that when the upper magnet set 720 and the lower magnet set 710 move relative to the metal plate 730 in X-Y plane, it produces electromagnetic damping force between the metal plate 730 and the lower magnet set 710 and the upper magnet set 720 to suppress the movement of the lower magnet set 710 and the upper magnet set 720. Accordingly, in this embodiment, the mass unit 70 can also provide damping force.

Figure 7:
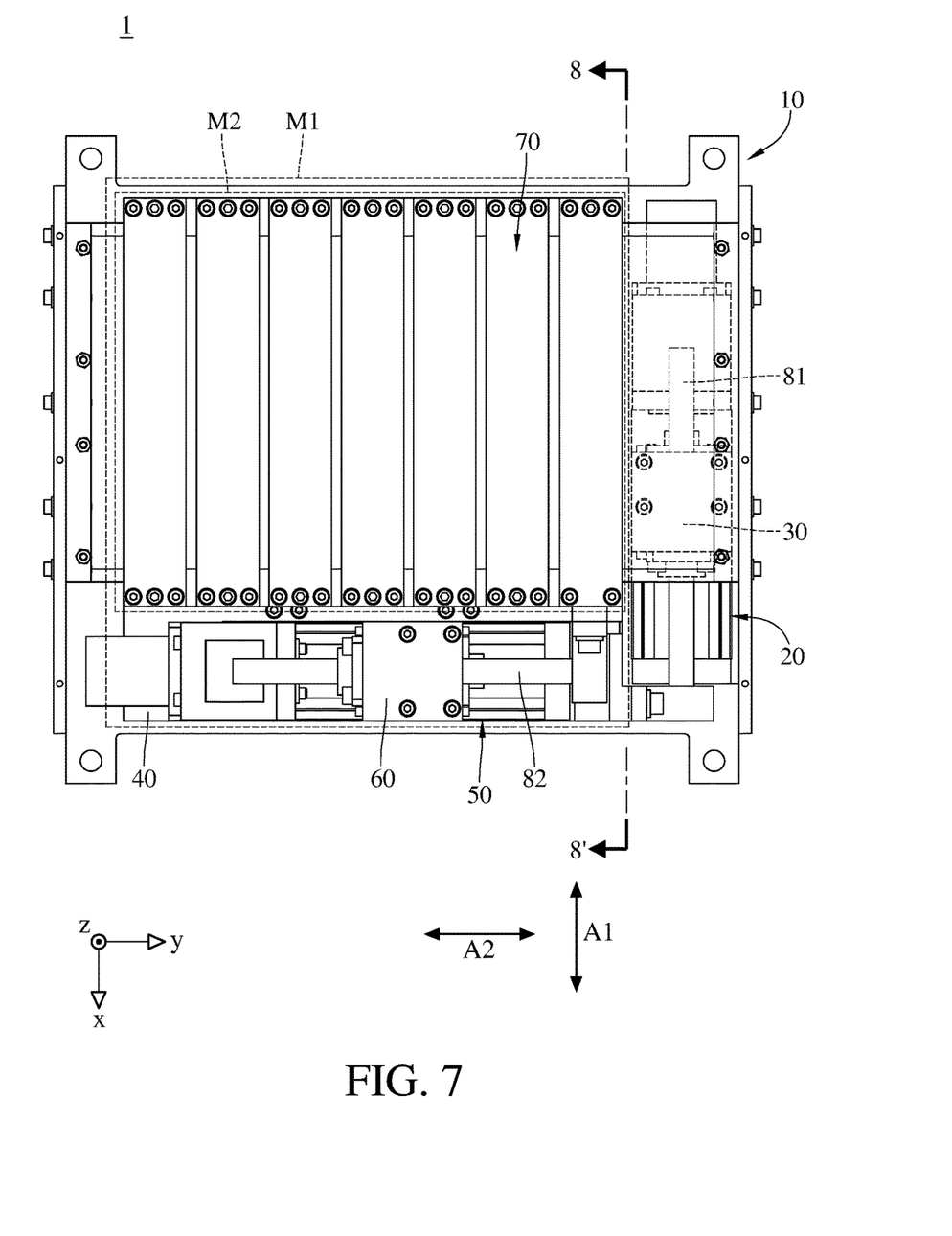
FIG. 7 is a top view of the adjustable damper in FIG. 1.
Figure 8:
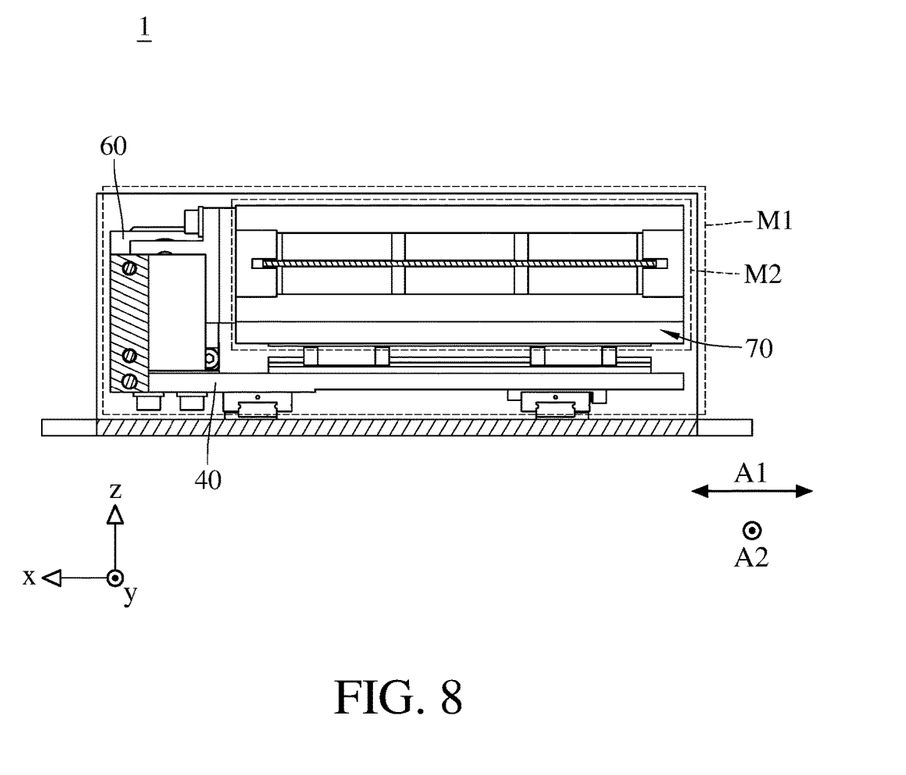
FIG. 8 is a cross-sectional view of the adjustable damper taken along 8-8' in FIG. 7.
Figure 9:
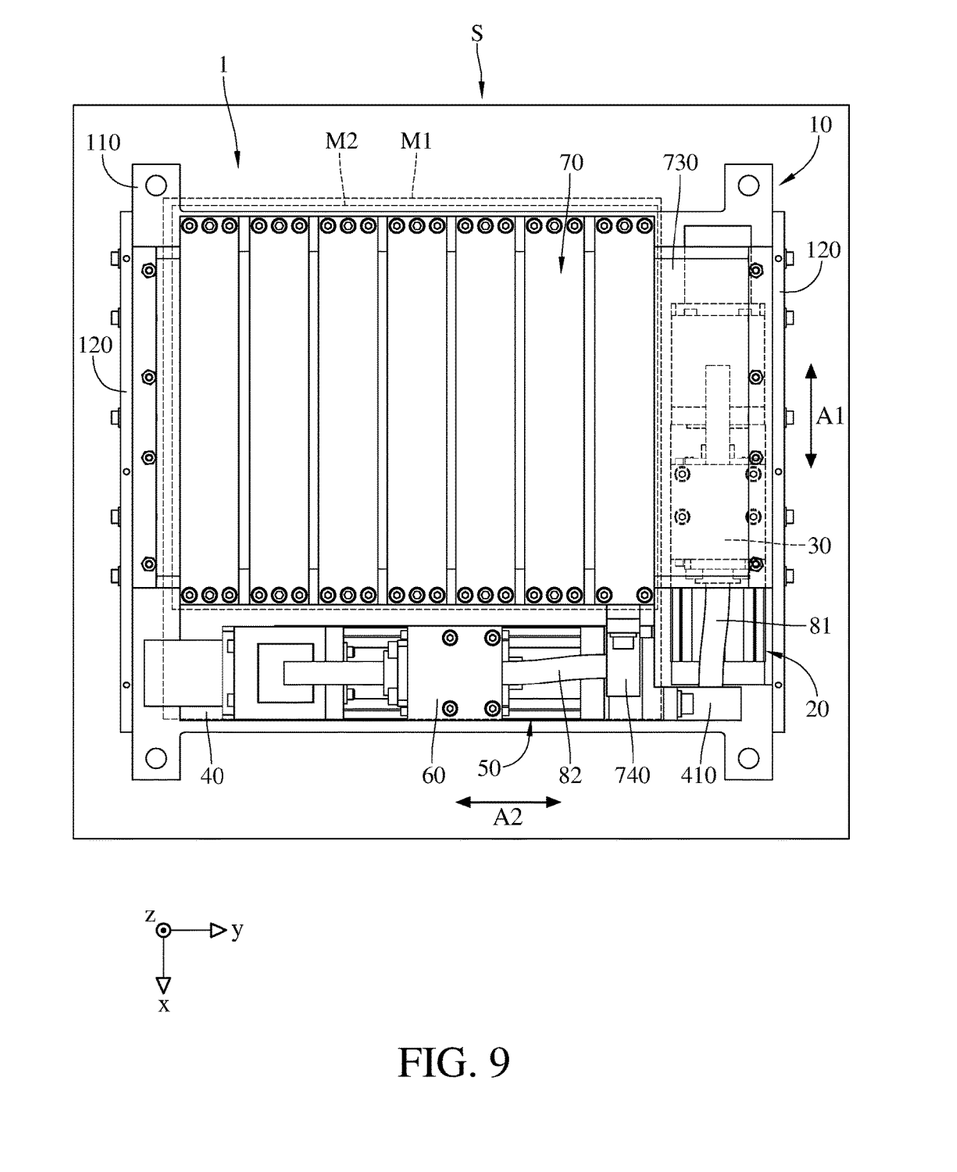
FIG. 9 shows a top view of the adjustable damper in FIG. 1 while the adjustable damper is in operation.

Then, please refer to FIGS. 7-9, FIG. 7 is a top view of the adjustable damper in FIG. 1, FIG. 8 is a cross-sectional view of the adjustable damper taken along 8-8' in FIG. 7, and FIG. 9 shows the operation of the adjustable damper in FIG. 1.

As shown in FIGS. 7-8, in this embodiment, the movable seat 40 and the other components thereon including the second slide mechanism 50, the second slidable member 60 and the mass unit 70 together define a first equivalent mass unit M1. In addition, the mass unit 70 itself defines a second equivalent mass unit M2. When the vibration energy of the main structure S transferred to the adjustable damper 1, the first equivalent mass unit M1 is only allowed to move along the second direction A2, and the second equivalent mass unit M2 is only allowed to move along the first direction A1. Therefore, the movements of the first equivalent mass unit M1 and the second equivalent mass unit M2 are independent from each other, and they are able to suppress vibrations in different directions.

For example, please see FIG. 9, which shows a top view of the adjustable damper 1 while the main structure S is in operation. When the main structure S operates, it vibrates along the X-axis and Y-axis, and its vibration energy would be transferred to the adjustable damper 1. As shown in FIG. 9, the movement of the main structure S toward the positive Y-axis would move the base 10, the first slide mechanism 20 and the metal plate 730 toward the positive Y-axis together. At this moment, the first cantilever 81, which is connected between the first equivalent mass unit M1 and the first slide mechanism 20 and extends in the first direction A1, would be deformed by the pulling force between the first equivalent mass unit M1 and the first slidable member 30. Since the electromagnetic damping force produced by the relative movement between the metal plate 730 and the upper magnet set 720 and the lower magnet set 710 can suppress the movement of the lower magnet set 710 and the upper magnet set 720, the mass unit 70 can produce a resistance force (i.e. the electromagnetic damping force) in the negative Y-axis to resist the movement of the main structure S toward the positive Y-axis, thereby suppressing the vibration of the main structure S in the Y-axis.

Similarly, in the X-axis, the movement of the main structure S toward the positive X-axis would move the base 10, the first slide mechanism 20, the movable seat 40, the second slide mechanism 50, the second slidable member 60 and the metal plate 730 toward the positive X-axis together. At this moment, the second cantilever 82, which is connected between the second equivalent mass unit M2 and the second slide mechanism 50 and extends in the second direction A2, would be deformed by the pulling force between the second equivalent mass unit M2 and the second slidable member 60. By the same manner, the mass unit 70 can produce a resistance force (i.e. the electromagnetic damping force) in the negative X-axis to resist the movement of the main structure S in the positive X-axis, thereby suppressing the vibration of the main structure S in the X-axis.

It is noted that the deformations of the cantilevers are properly exaggerated for illustrative purpose.

Accordingly, the adjustable damper 1 is able to respectively produce resistance forces in different directions to suppress or absorb the vibrations of the main structure S in different directions, thereby reducing the vibrations of the main structure S to a low level.

In addition, it is worth to mention that the adjustable damper of the present disclosure is able to adjust its natural vibration frequency to automatically match the varied vibration frequency of the main structure. Please refer to FIGS. 10-11 for more details, FIG. 10 is a block diagram showing the electrical connections in the adjustable damper in FIG. 1, and FIG. 11 is a flow chart showing a method for controlling the adjustable damper in FIG. 1.

Figure 10:
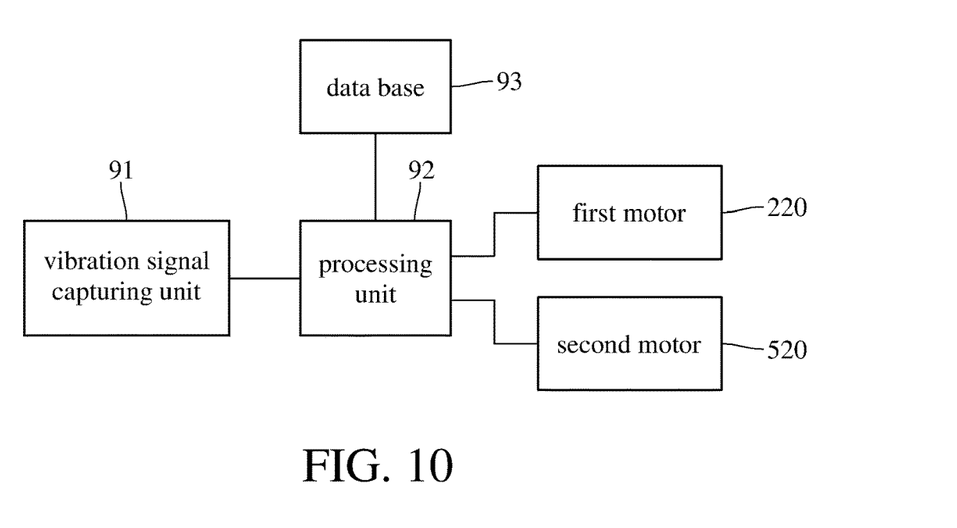
FIG. 10 is a block diagram showing the electrical connections in the adjustable damper in FIG. 1.

As shown in FIG. 10, the adjustable damper 1 further includes a vibration signal capturing unit 91, a processing unit 92 and a data base 93, the vibration signal capturing unit 91 and the data base 93 are electrically connected to the processing unit 92. The vibration signal capturing unit 91 is a, for example, a multi-directional accelerometer or a plurality of single directional accelerometer, for capturing vibration signals of the main structure S in the X-axis and/or the Y-axis. The processing unit 92 is electrically connected to the first motor 220 of the first slide mechanism 20 and the second motor 520 of the second slide mechanism 50 and is able to adjust the position of the first slidable member 30 on the first cantilever 81 and the position of the second slidable member 60 on the second cantilever 82 by controlling the first motor 220 and the second motor 520. The data base 93 stores data relevant to the positions of the first slidable member 30 and the second slidable member 60 and a relation table containing the position data and corresponding natural vibration frequencies of the adjustable damper 1.

Figure 11:
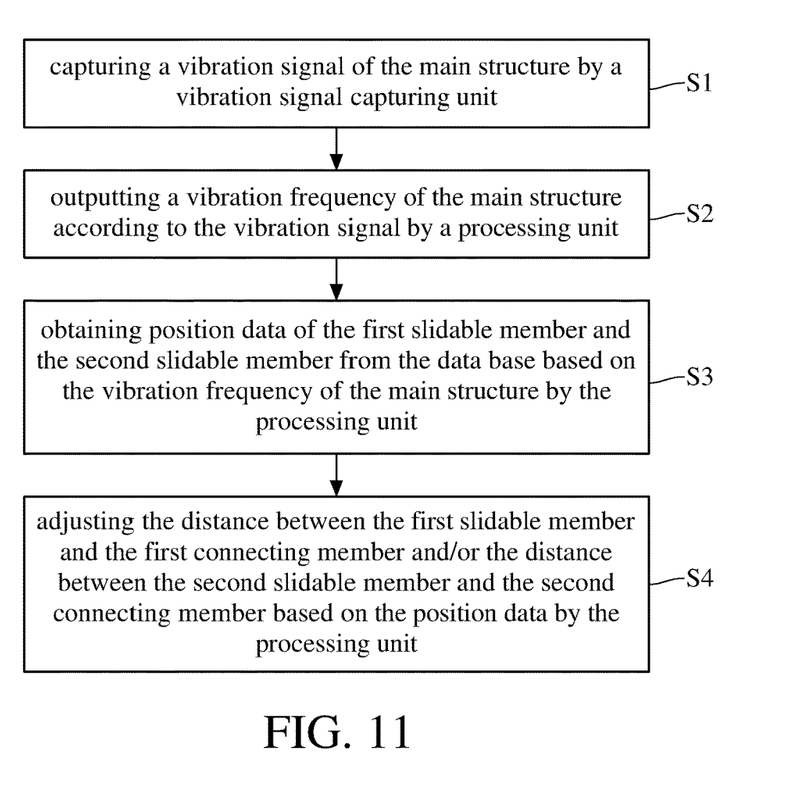
FIG. 11 is a flow chart showing a method for controlling the adjustable damper in FIG. 1.

In actual operation, as shown in FIG. 11, beginning at step S1, the adjustable damper 1 can capture vibration signals of the main structure S through the vibration signal capturing unit 91, and transmit it to the processing unit 92. The vibration signal is relevant to the vibration frequency of the main structure S. Then, at step S2, the processing unit 92 outputs a vibration frequency of the main structure S according to the vibration signals and pre-built data of the main structure S. Then, at step S3, the processing unit 92 obtains the position data of the first slidable member 30 and the second slidable member 60 in the data base 93 based on the vibration frequency of the main structure S; that is, finding the desired positions of the slidable members 30 and/or 60 corresponding to the vibration frequency of the main structure S. Finally, at step S4, based on the position data obtained from the data base 93, the processing unit 92 controls the first motor 220 and/or the second motor 520 to adjust the distance between the first slidable member 30 and the first connecting member 410 and/or the distance between the second slidable member 60 and the second connecting member 740 in order to move the first slidable member 30 and the second slidable member 60 to desired positions. That is, the processing unit 92 adjust the distance between the first slidable member 30 and the first connecting member 410 and/or the distance between the second slidable member 60 and the second connecting member 740 based on the vibration frequency of the main structure S.

Please refer back to FIG. 9, the deformable length of the first cantilever 81 and/or the deformable length of the second cantilever 82 can be adjusted by adjusting the position of the first slidable member 30 and/or the position of the second slidable member 60. Adjusting the deformable length of the first cantilever 81 or the second cantilever 82 is to adjust the stiffness of the adjustable damper 1 in the respective direction.

For example, when the first slidable member 30 on the first cantilever 81 slides toward the first connecting member 410, the deformable length of the first cantilever 81 is shortened, which makes the first equivalent mass unit M1 harder to be moved in the direction (i.e. the second direction A2) perpendicular to the first cantilever 81; that is, the stiffness of the adjustable damper 1 in the second direction A2 increases when the first slidable member 30 moves toward the first connecting member 410. On the contrary, when the first slidable member 30 on the first cantilever 81 slides away from the first connecting member 410, the deformable length of the first cantilever 81 is lengthen, which makes the first equivalent mass unit M1 easier to be moved in the second direction A2; that is, the stiffness of the adjustable damper 1 in the second direction A2 decreases when the first slidable member 30 moves away from the first connecting member 410.

Similarly, when the second slidable member 60 on the second cantilever 82 slides toward the second connecting member 740, the deformable length of the second cantilever 82 is shortened, which makes the second equivalent mass unit M2 harder to be moved in a direction (i.e. the first direction A1) perpendicular to the second cantilever 82; that is, the stiffness of the adjustable damper 1 in the first direction A1 increases when the second slidable member 60 moves toward the second connecting member 740. On the contrary, when the second slidable member 60 on the second cantilever 82 slides away from the second connecting member 740, the deformable length of the second cantilever 82 is lengthen, which makes the second equivalent mass unit M2 easier to be moved in the first direction A1; that is, the stiffness of the adjustable damper 1 decreases when the second slidable member 60 moves away from the second connecting member 740. Accordingly, the stiffness of the adjustable damper 1 in the first direction A1 and the second direction A2 is independent from each other.

It is known that the natural vibration frequency of the adjustable damper 1 varies with its stiffness, thus by using the aforementioned method to adjust the positions of the first slidable member 30 and/or the second slidable member 60 is able to adjust the stiffness of the adjustable damper 1 in different directions, thereby adjusting the natural vibration frequency of the adjustable damper 1. By doing so, the natural vibration frequency of the adjustable damper 1 can be automatically adjusted to match the vibration frequency of the main structure S1.

In a practical example that the adjustable damper 1 is disposed on a turning machine, the adjustable damper 1 is able to effectively suppress or absorb the multidirectional vibrations of the turning machine. As the vibration frequency of turning machine varies due to the variation of the speed of the tool or the movement of the tool, the first slidable member 30 and/or the second slidable member 60 would be moved to desired positions by using the aforementioned method, such that the natural vibration frequency of the adjustable damper 1 would automatically match the current vibration frequency of the main structure S so as to suppress or absorb the vibration energy of the main structure S. By using the adjustable damper 1, the tool's lifespan is increased, and the tool is allowed to cut deeper.

In addition, please refer back to FIG. 2, one or more load block 94 is able to be disposed on the top surface of the upper magnet set 720, increasing the applicability of the adjustable damper 1.

Furthermore, it is noted that the present disclosure is not limited to the aforementioned mass unit 70. In some other embodiments, the mass unit may be replaced by anther mass unit (or the load block 94) without damping function; in such a case, the mass unit may be attached with one or more damping devices, such as viscous damping devices, hydraulic damping devices, elastomer damping devices or frictional damping devices, and these damping devices may be disposed on different sides of the mass unit.

According to the adjustable damper and the method as discussed above, since the first slidable member is movable close to or away from the first connecting member, and the second slidable member is movable close to or away from the second connecting member, the stiffness of the adjustable damper in the first direction and the second direction becomes adjustable, making the natural vibration frequency of the adjustable damper changeable and able to selectively or automatically match the vibration frequency of the main structure.

Therefore, the adjustable damper of the present disclosure can suppress multidirectional vibrations of the main structure. In addition, according to the variation of the vibration frequency of the main structure, the adjustable damper can automatically adjust its stiffness in different directions in order to change its natural vibration frequency to match the current vibration frequency of the main structure.

Furthermore, the stiffness of the adjustable damper of the present disclosure in different directions are independent from each other, which is beneficial to improve its applicability.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. An adjustable damper, comprising:
a base;
a first slidable member, slidably disposed on the base in a first direction;
a movable seat, slidably disposed on the base in a second direction, wherein the second direction is orthogonal to the first direction;
a second slidable member, slidably disposed on the movable seat in the second direction;
a mass unit, slidably disposed on the movable seat in the first direction;
a first cantilever, fixed to a first connecting member and extending in the first direction, the first connecting member connected to the movable seat, the first slidable member movably disposed on the first cantilever so as to be moved close to or away from the first connecting member along the first cantilever; and
a second cantilever, fixed to a second connecting member and extending in the second direction, the second connecting member connected to the mass unit, the second slidable member movably disposed on the second cantilever so as to be moved close to or away from the second connecting member along the second cantilever.

2. The adjustable damper according to claim 1, wherein the movable seat, the second slidable member and the mass unit together define a first equivalent mass unit, and the mass unit defines a second equivalent mass unit.

3. The adjustable damper according to claim 1, further comprising a first slide mechanism disposed on the base, and the first slidable member disposed on the first slide mechanism so as to be moved close to or away from the first connecting member along the first direction.

4. The adjustable damper according to claim 3, wherein the first slide mechanism comprises a first slide rail and a first motor, and the first slidable member is slidably disposed on the first slide rail so as to be moved along the first direction by being driven by the first motor.

5. The adjustable damper according to claim 1, further comprising a second slide mechanism disposed on the movable seat, and the second slidable member disposed on the second slide mechanism so as to be moved close to or away from the second connecting member along the second direction.

6. The adjustable damper according to claim 5, wherein the second slide mechanism comprises a second slide rail and a second motor, and the second slidable member is slidably disposed on the second slide rail so as to be moved along the second direction by being driven by the second motor.

7. The adjustable damper according to claim 1, wherein the mass unit comprises an upper magnet set, a lower magnet set and a metal plate, the lower magnet set is slidably disposed on the movable seat in the first direction, the upper magnet set is stacked above the lower magnet set, the second connecting member is fixed to the upper magnet set and/or the lower magnet set, the metal plate is fixed to the base, the metal plate is located between and spaced apart from the upper magnet set and the lower magnet set, such that the upper magnet set and the lower magnet set are respectively movable with respect to two opposite surfaces of the metal plate.

8. The adjustable damper according to claim 1, further comprising at least one damping device disposed on the mass unit, wherein the at least one damping device is a viscous damping device, a hydraulic damping device, an elastomer damping device or a frictional damping device.

9. The adjustable damper according to claim 1, further comprising a vibration signal capturing unit and a processing unit, wherein the vibration signal capturing unit is configured to capture a vibration signal of a main structure, the processing unit is capable of outputting a vibration frequency of the main structure according to the vibration signal and adjusting a distance between the first slidable member and the first connecting member and/or a distance between the second slidable member and the second connecting member based on the vibration frequency, thereby adjusting a natural vibration frequency of the adjustable damper to match the vibration frequency of the main structure.

* * * * *